(12) United States Patent
Kim et al.

(10) Patent No.: US 12,021,393 B2
(45) Date of Patent: Jun. 25, 2024

(54) ELECTRONIC DEVICE, CONTROL METHOD THEREOF, AND WIRELESS POWER TRANSCEIVING SYSTEM

(71) Applicant: LG ELECTRONICS INC., Seoul (KR)

(72) Inventors: Beom Ju Kim, Seoul (KR); Jung Suk Han, Seoul (KR); Jin Haeng Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

(21) Appl. No.: 17/597,847

(22) PCT Filed: Aug. 27, 2019

(86) PCT No.: PCT/KR2019/010923
§ 371 (c)(1),
(2) Date: Jan. 26, 2022

(87) PCT Pub. No.: WO2021/040071
PCT Pub. Date: Mar. 4, 2021

(65) Prior Publication Data
US 2022/0285986 A1  Sep. 8, 2022

(51) Int. Cl.
*H02J 50/10* (2016.01)
*H02J 7/00* (2006.01)

(52) U.S. Cl.
CPC ............ *H02J 50/10* (2016.02); *H02J 7/0049* (2020.01); *H02J 7/0063* (2013.01); *H02J 7/0068* (2013.01); *H02J 7/00712* (2020.01); *H02J 2207/20* (2020.01)

(58) Field of Classification Search
CPC ...... H02J 50/10; H02J 7/0049; H02J 7/00712; H02J 7/0063; H02J 7/0068; H02J 2207/20
See application file for complete search history.

(56) References Cited

U.S. PATENT DOCUMENTS

| | | | |
|---|---|---|---|
| 2018/0034305 A1* | 2/2018 | Lee | H02J 50/60 |
| 2019/0260240 A1* | 8/2019 | Kwon | H02J 50/12 |

FOREIGN PATENT DOCUMENTS

| | | | |
|---|---|---|---|
| JP | 2010220460 | 9/2010 | |
| JP | 2017070182 | 4/2017 | |
| JP | 2017070182 A * | 4/2017 | ............... B60L 1/00 |

(Continued)

OTHER PUBLICATIONS

Korean Intellectual Property Office Application No. 10-2021-7038620, Office Action dated Oct. 12, 2023, 4 pages.

*Primary Examiner* — Jared Fureman
*Assistant Examiner* — Duc M Pham
(74) *Attorney, Agent, or Firm* — LEE, HONG, DEGERMAN, KANG & WAIMEY

(57) ABSTRACT

An electronic device, a control method thereof, and a wireless power transceiving system are proposed. The electronic device, the control method thereof, and the wireless power transceiving system are provided with a battery and a converter configured to receive wireless power to output the wireless power to a load, and control the power to be supplied to the load through an output of any one of the battery and the converter in response to a power change of a load. Accordingly, stable power may be supplied to the electronic device even with small output wireless power.

18 Claims, 11 Drawing Sheets

(56) References Cited

FOREIGN PATENT DOCUMENTS

| KR | 20140136536 A | * | 5/2013 | ............ | H02J 17/00 |
| KR | 20170082029 A | * | 1/2016 | ............ | G06F 1/263 |
| KR | 20160047186 A | * | 5/2016 | ............ | G06F 16/00 |

* cited by examiner (a)

(b)

ELECTRONIC DEVICE, CONTROL METHOD THEREOF, AND WIRELESS POWER TRANSCEIVING SYSTEM

CROSS-REFERENCE TO RELATED APPLICATIONS

This application is the National Stage filing under 35 U.S.C. 371 of International Application No. PCT/KR2019/010923, filed on Aug. 27, 2019, the contents of which are all incorporated by reference herein in its entirety.

TECHNICAL FIELD

The present disclosure relates to an electronic device, a control method thereof, and a wireless power transceiving system and, more particularly, to an electronic device that operates by wirelessly receiving power, a control method thereof, and a wireless power transceiving system.

BACKGROUND ART

Wireless power transmission is an energy delivery method that removes wires and transmits energy electromagnetically, advancing from a method that transmits power through a conventional wire and uses the power as a power source for electronic devices. The wireless power transmission technology includes an electromagnetic induction method and a resonance method. The electromagnetic induction method is a method of transmitting power by generating a magnetic field through a power transmitting coil (i.e., primary coil) in a power transmitting part, and by positioning a power receiving coil (i.e., secondary coil) at a position where electric current may be induced. The resonance method transmits energy by using a resonance phenomenon between the power transmitting coil and the power receiving coil.

Recently, there is a movement to develop technology for applying the wireless power technology having a magnetic induction type to electronic devices such as display devices. However, for an electronic device installed on a wall, such as a wall-mounted display device, it is difficult to apply such wireless power technology to the electronic device due to the size and weight of the power receiving coil to be installed on the wall together with the electronic device.

In particular, in the case of an electronic device, such as an OLED display module, having an operating load characteristic, a wireless power transmission system should be implemented according to the maximum power that is required as the power of a load changes dynamically, but there is a problem that it is difficult to apply the current technology to the wall-mounted electronic device that is mounted on the wall, due to the size and weight of the coil.

DISCLOSURE

Technical Problem

An objective of the present disclosure for solving the problems is to provide an electronic device, a control method thereof, and a wireless power transceiving system, wherein the electronic device may respond to dynamic load changes while the size and weight of a coil for receiving wireless power is reduced.

Another objective of the present disclosure for solving the problems is to provide an electronic device, a control method thereof, and a wireless power transceiving system, wherein power may be stably supplied in response to changes in load power by receiving wireless power from an electronic device having a dynamic load characteristic.

Yet another objective of the present disclosure for solving the problems is to provide an electronic device, a control method thereof, and a wireless power transceiving system, wherein a wireless power transmission device is controlled so that electric power is stably supplied with wireless power in electronic devices having the dynamic load characteristic.

Technical Solution

In order to solve the above described problems, an electronic device, a control method thereof, and a wireless power transceiving system according to an exemplary embodiment of the present disclosure include a battery and a converter for receiving wireless power and outputting the wireless power to a load, and control to supply the power to the load through an output of any one of the battery and the converter in response to a power change of a load.

In order to solve the above described problems, the electronic device, the control method thereof, and the wireless power transceiving system according to the exemplary embodiment of the present disclosure include a switching unit configured to perform switching so that any one of an output of the converter and an output of the battery is connected to an input of the load, and control the switching unit to supply any one of the power of the converter and the battery to the load in response to the power change of the load.

In order to solve the above described problems, the electronic device, the control method thereof, and the wireless power transceiving system according to the exemplary embodiment of the present disclosure set an output voltage of the converter and an output voltage of the battery to be different, and control turning on/off of the converter so that any one of the outputs is connected to the input of the load in response to the power change of the load.

In order to solve the above described problems, the electronic device, the control method thereof, and the wireless power transceiving system according to the exemplary embodiment of the present disclosure control at least one of a duty ratio and a frequency of the inverter of the wireless power transmission device in response to the power change of the load to be supplied with stable wireless power.

In order to solve the above described problems, the electronic device, the control method thereof, and the wireless power transceiving system according to the exemplary embodiment of the present disclosure are supplied with the power from the battery or charge the battery in a standby mode, supply the power to the load with the battery when the power is turned on, and control the output of the converter to be input to the load after the wireless power is stably received.

Advantageous Effects

As described above, the electronic device, the control method thereof, and the wireless power transceiving system according to an exemplary embodiment of the present disclosure may stably supply power to electronic devices even with small output wireless power by inputting any one output of a battery and a converter to a load in response to a power change of a load having the dynamic load characteristic.

As described above, the electronic device, the control method thereof, and the wireless power transceiving system according to the exemplary embodiment of the present disclosure may stably supply wireless power to the wireless power electronic devices by controlling at least one of an inverter duty ratio and a frequency of the wireless power transmission system in response to the power change of the load.

MODE FOR INVENTION

Figure 1:
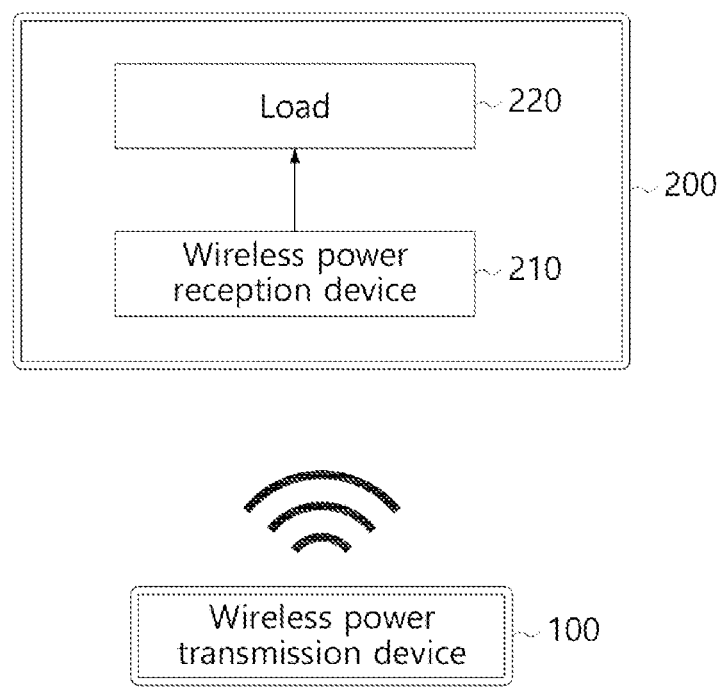
FIG. 1 is a schematic diagram of a wireless power transceiving system according to an exemplary embodiment of the present disclosure.

Hereinafter, specific exemplary embodiments of the present disclosure will be described with reference to the drawings.

Advantages and features of the present disclosure, and a method of achieving them will become apparent with reference to the exemplary embodiments described below in detail together with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

FIG. 1 is a schematic diagram of a wireless power transceiving system according to the exemplary embodiment of the present disclosure. The wireless power transceiving system according to the exemplary embodiment of the present disclosure includes: a wireless power transmission device 100 configured to transmit wireless power; a wireless power reception device 210 configured to receive and convert the power transmitted from the wireless power transmission device 100 and output the power to a load 220; and the load 220. The wireless power reception device 210 and the load 220 constitute one electronic device 200.

The electronic device 200 according to the present disclosure is applicable to various electronic devices 200 such as a display device 201, a TV, a monitor, a washing machine, a refrigerator, and an audio module, and in particular, is preferable to be applied to the electronic device 200 including a display panel 221, the audio module, or a motor, which have a dynamic load characteristic. The load 220 is an operation module provided in the electronic device 200. For example, the load 220 in a case of the display device 201 such as a TV or a monitor may include the display panel 221, the load 220 in a case of a washing machine may include a washing tub driving part, and the load 220 in a case of a refrigerator may include a compressor, a motor, and the like.

Hereinafter, the display device 201 to which the wireless power transmission technology is applied will be described as an example of the electronic device 200.

Figure 2:
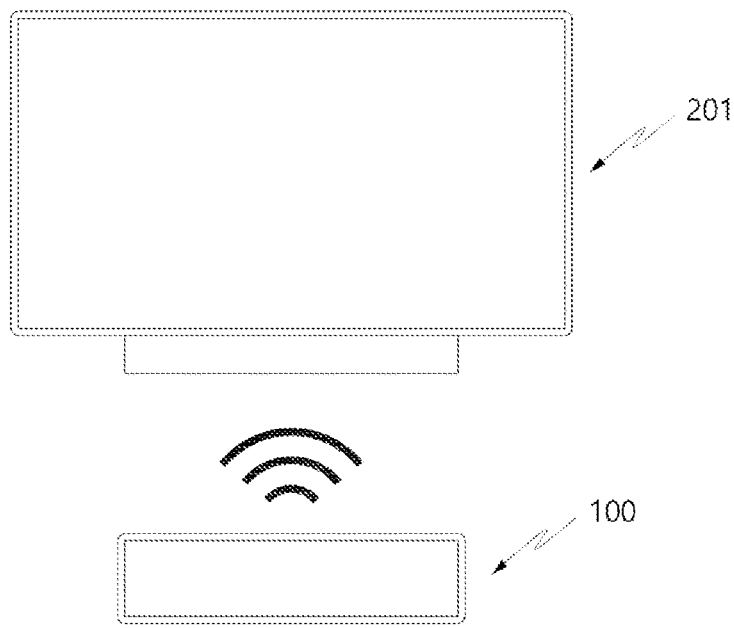
FIG. 2 is a schematic diagram of a wall-mounted display system according to another exemplary embodiment of the present disclosure.
Figure 3:
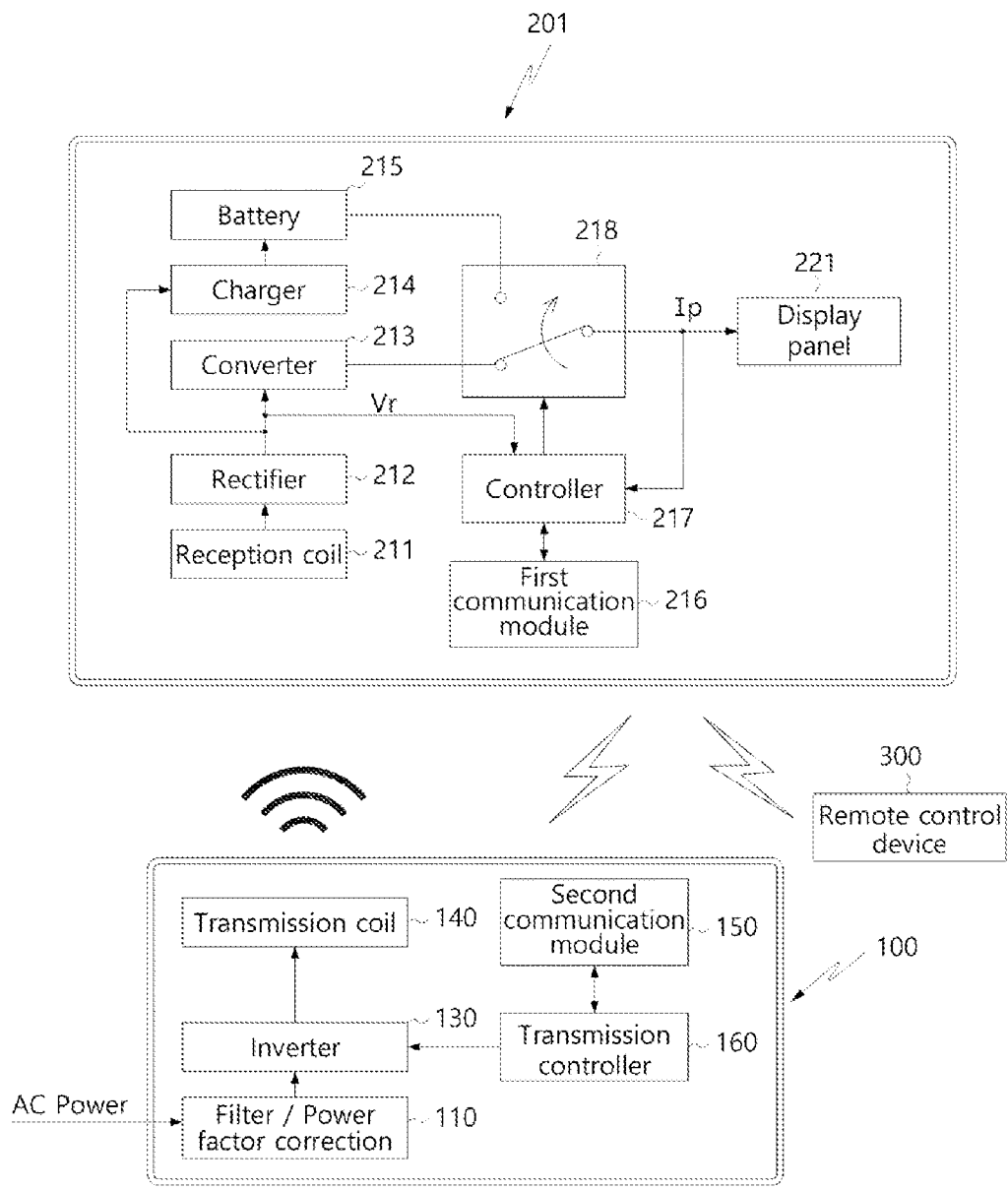
FIG. 3 is a control block diagram of a display system according to another exemplary embodiment of the present disclosure.

FIG. 2 is a schematic diagram of a wall-mounted display system according to another exemplary embodiment of the present disclosure, and FIG. 3 is a control block diagram of a display system. Referring to FIG. 2, the wireless power transmission device 100 for transmitting wireless power, the wireless power reception device 210, and the display device 201 provided with the display panel 221 are included.

The wireless power transmission device 100 is a device for supplying power to the display device 201 in a wireless method, is electrically connected to an electrical outlet for supplying the power to rooms by using a separate power plug, and is configured to have a transmission power transmitting coil disposed therein to emit a magnetic field. Although it is illustrated that the wireless power transmission device 100 is disposed at a position under the display device 201, the position where the wireless power transmission device 100 is disposed is not limited thereto, but may be disposed at a corresponding position capable of transmitting power to the wireless power reception device 210. For example, when the wireless power reception device 210 is coupled to an upper side, a left side, and a right side of the display panel 221, the wireless power transmission device 100 may be disposed on the upper side, the left side, and the right side of the display panel 221.

The display panel 221 is for displaying an image on a screen, and may be implemented by a liquid crystal display (LCD) panel, a light-emitting diode (LED) panel, and an organic light-emitting diode (OLED) panel, or the like. In the present exemplary embodiment, an OLED panel having the operating load characteristic will be described as an example. For example, a 65-inch OLED panel requires a 500 W-class wireless power transceiving system due to the dynamic load characteristic, and the 500 W-class wireless power transceiving system is difficult to be implemented as a wall-mount type system due to the size and weight of a coil therein. The electronic device 200 according to the present disclosure is provided with a battery 215, so that not only the power capacity of the wireless power transceiving system is designed to be reduced, but also the remaining necessary power may be supplied from the battery 215.

Referring to FIG. 3, the wireless power transmission device 100 includes: a filter/power factor correction 110, an inverter 130, a transmission coil 140, a second communication module 150, and a transmission controller 160. The filter/power factor correction 110 is implemented by integrating a filter configured to receive power input from outside and remove electromagnetic interference (EMI), and a power factor correction circuit configured to compensate for a power factor of the noise-removed power. The inverter 130 is connected to the filter/power factor correction to convert an input direct current (DC) voltage into an alternate current (AC) voltage, and the transmission coil 140 is connected to the inverter 130 to generate a magnetic field by the AC voltage of the inverter 130.

The second communication module 150 is a module for communication with the wireless power reception device 210, and may include a communication module capable of receiving control signals for controlling the power on/off and the inverter 130 from the wireless power reception device 210 according to various communication methods such as Bluetooth, Ultra-Wideband (WB), a ZigBee method, a radio frequency (RF) communication method, or an infrared (IR) communication method, and then processing the control signals. In the present exemplary embodiment, the communication with the wireless power reception device through Bluetooth communication will be described as an example.

The transmission controller 160 serves to perform overall control of the wireless power transmission device 100, and receives the control signals through the communication with the wireless power reception device 210, so as to control the output of the inverter 130.

The display device 201 includes the wireless power reception device 210 and the display panel 221, and the wireless power reception device 210 includes: a reception coil 211, a rectifier 212, and a converter 213, a charger 214, the battery 215, a first communication module 216, a controller 217, and a switching unit 218. Referring to FIG. 2, a reception coil 211 is installed at a lower part of the display device 201, and components may be respectively installed at a lower part, a rear side, and the like of a display panel. As another example, the reception coil 211, the rectifier 212, and the converter 213 may be provided in a separate module on the lower part of the display device 201, and the charger 214, the first communication module 216, and the controller 217 may be provided integrally with the display panel 221. In addition, the display panel 221 may be provided to be easily separable from the separate module thereunder.

The reception coil 211 receives power by generating an induced electromotive force by the magnetic inductive coupling with the transmission coil 140. The rectifier 212 is for rectifying the voltage generated by the reception coil 211, and may be configured to include a bridge diode that converts AC power to direct current by full-wave rectification.

The converter 213 is implemented as a DC/DC converter 213 in order to convert the output voltage of the rectifier 212 into a target voltage and output the target voltage to the load 220.

The battery 215 is for supplying power to the load 220, and the charger 214 charges the battery 215 by using the output voltage of the rectifier 212. A seating module (not shown) for the battery 215 may be provided on a rear surface of the display panel 221 so that the battery 215 may be detachably attached. In addition, the display device 201 may have a function of an indicator to notify the time to replace the battery 215 when the life of the battery 215 has expired, and may inform, through the indicator, a user of a case when the battery 215 has been removed. When necessary, the user may simply remove and charge the battery 215 through a separate charging module, or may have a plurality of batteries 215 and use each battery alternately. In addition, since the display device 201 according to the present disclosure has the battery 215, the display device may be simply separated from a wall and used as a portable device by using the power of the battery 215.

The first communication module 216 is a module for the communication with the wireless power transmission device 100 or a remote control device 300 (e.g., remote control), and may include a communication module for transmitting and receiving signals with the wireless power transmission device 100 and the remote control device 300 according to various communication methods such as Bluetooth, Ultra-Wideband (WB), the Zigbee method, the radio frequency (RF) communication method, or the infrared (IR) communication method. In the present exemplary embodiment, the communication with the wireless power transmission device and the remote control device 300 through Bluetooth communication will be described as an example.

The controller 217 serves to perform overall control of the wireless power reception device 210, and controls any one of the outputs of the battery 215 and the converter 213 to be input to the display panel 221 in response to a power change of the display panel 221. The controller 217 may be implemented by including a memory (not shown) configured to store program codes and data, which are for signal processing and control, and a processor (not shown) for executing the program codes and data.

In response to a power change of the load 220, the wireless power reception device 210 according to the present disclosure operates by supplying the output of the converter 213 to the load 220 when the power of the load 220 is less than or equal to a reference value, and operates by supplying the power of the battery 215 to the load 220 when the power of the load 220 is greater than or equal to the reference value. By detecting the power of the load 220 having the dynamic load characteristic, the load is controlled to be supplied with the power from the converter 213 when the power of the load 220 is less than or equal to the predetermined reference value, and the load is controlled to be supplied with the power from the output of the battery 215 whenever the power of the load 220 momentarily is greater than the predetermined reference value.

For example, when it is assumed that the display panel 221 is a 65-inch OLED panel and requires 500 W-class power, the wireless power transceiving system using 150 W-class electrical energy may be implemented to be able to receive instantaneous power 500 W from the battery 215. In this case, it may be controlled such that when the power of the display panel 221 is less than or equal to 150 W, the output of the converter 213 is input to the display panel 221, and whenever the power of the display panel 221 is greater than 150 W, the power of the battery 215 is supplied to the display panel 221. In this case, the predetermined reference value of power may be determined in consideration of the size, required power, size and weight of coil, power safety, and the like of the display panel 221, and in the present exemplary embodiment, the power of 150 W will be described as an example.

Referring to FIG. 3, the display device 201 according to the present exemplary embodiment includes the switching unit 218 for selectively connecting any one of outputs of the converter 213 and the battery 215 to the display panel 221. By detecting the power of the display panel 221, the controller 217 controls the switching unit 218 so as to input the output of the converter 213 to the display panel 221 when the power of the display panel 221 is less than or equal to a first threshold value (e.g., 150 W), and controls the switching unit 218 so as to input the power of the battery 215 to the display panel 221 when the power of the display panel 221 is greater than the first threshold value (e.g., 150 W).

The controller 217 may connect a sensing resistor for sensing current of the display panel 221 to an input side of the display panel 221 in series, and detect a voltage drop occurring at opposite ends of the sensing resistor at an ADC terminal to indirectly detect power (current $I_p$) of the display panel 221. Here, in addition to the above-described method, the detection of power or current of the display panel 221 may be performed by using various methods and connecting various detection circuits.

Figure 4:
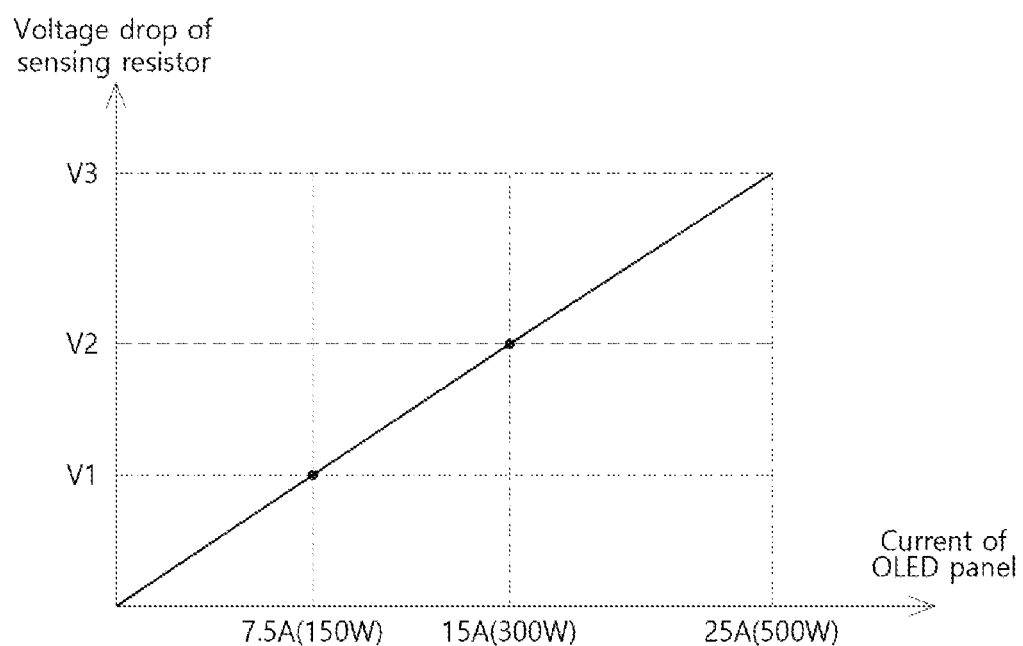
FIG. 4 is a view schematically illustrating a voltage drop value of a sensing resistor and values of current ($I_p$) and power of a display panel corresponding to the voltage drop value, which are sensed by a controller.

FIG. 4 is a view schematically illustrating a voltage drop value of the sensing resistor and values of current $I_p$ and power of the display panel 221 corresponding to the voltage drop value, which are sensed by the controller 217. Referring to FIG. 4, the voltage drop applied to the opposite ends of the sensing resistor increases as the power of the display panel 221 increases. The controller 217 may have a data table that is generated in advance and related to a relationship between the current (power) values of the display panel 221 according to the voltage value applied to the opposite ends of the sensing resistor, and the controller 217 may control the switching unit 218 by checking the current (power) values corresponding to the detected voltage drop value. As another example, the controller 217 may have a table that is generated in advance by using values of control commands (e.g., power on/off) of the switching unit 218 corresponding to the detected voltage drop value, and may control the switching unit 218 on the basis of the values of the table.

Meanwhile, the controller 217 outputs control signals of the inverter 130 in order to control the power supply of the wireless power transmission device 100 in response to the power change of the display panel 221. In addition, the controller 217 may stably control the power supply of the wireless power transmission device 100, in response to a change in the load power, by sensing the output voltage $V_r$ of the rectifier 212, that is, the input voltage of the converter 213.

Figure 5:
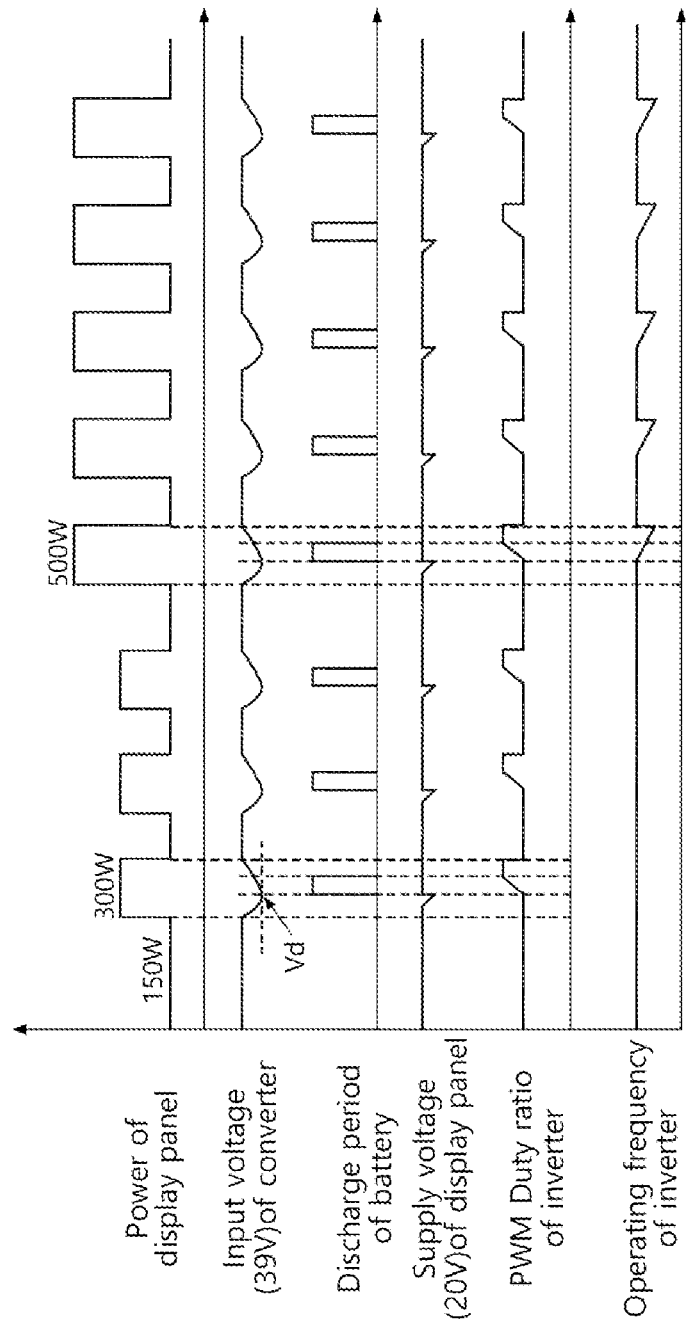
FIG. 5 is a schematic diagram for describing an operation and a state of each component according to a method for controlling a power supply in the wireless power transceiving system according to the exemplary embodiment of the present disclosure.

In the present disclosure, the controller 217 may control the wireless power transceiving system in three modes in response to the power change of the display panel 221. Hereinafter, three control modes of the wireless power transceiving system will be described in detail. FIG. 5 is a schematic diagram for describing an operation and a state of each component according to a method for controlling a power supply in the wireless power transceiving system according to the exemplary embodiment of the present disclosure.

Referring to FIG. 5, each of the detected power of the display panel 221, the input voltage of the converter 213, the discharge period of the battery 215, the supply voltage of the display panel 221, the PWM duty ratio of the inverter 130, and the operating frequencies of the inverter 130 is sequentially shown on a vertical axis, and a horizontal axis is meant to be time. In the present exemplary embodiment, it is exemplified that the supply voltage of the display panel 221 is 20V and the output voltage of the rectifier 212, that is, the input voltage of the converter 213 is set to 39V.

First, in a case where the power of the display panel 221 is less than or equal to the first threshold value (e.g., 150 W), the case is a normal mode, and the controller 217 controls the switching unit 218 so that the output of the converter 213 is input to the display panel 221. The wireless power transmission device 100 operates with a preset control value so that power is stably supplied to the display panel 221. In this case, the controller 217 controls surplus power so that the charger 214 may charge the battery 215.

In a case where the power of the display panel 221 is greater than the first threshold value (e.g., 150 W) and is less than or equal to a second threshold value (e.g., 300 W), the case is a pulse width control mode, and the controller 217 controls the switching unit 218 so that the output of the battery 215 is input to the display panel 221, and outputs a control signal for increasing the pulse width modulation duty ratio of the inverter 130. The wireless power transmission device 100 receives the control signal of the controller 217 through the second communication module 150 so as to increase the PWM duty ratio of the inverter 130, thereby increasing the power supply. Here, the second threshold value may be determined in consideration of the characteristics, size, required power, power safety, and the like of the display panel 221, and in the present exemplary embodiment, the power of 300 W will be described as an example.

Referring to FIG. 5, when the power of the display panel 221 rises to 300 W, a voltage drop occurs in the sensing resistor connected to the input side of the display panel 221 to a predetermined value $V_2$, and the input voltage of the converter 213, that is, the output voltage of the rectifier 212 is also dropped. When the voltage drop of the predetermined value $V_2$ occurs in the sensing resistor and the output voltage of the rectifier 212 drops, the controller 217 controls the switching unit 218 to connect the output of the battery 215 to the input of the display panel 221, and when the input voltage $V_r$ of the converter 213 drops to a value less than or equal to a predetermined reference value $V_d$, the controller 217 discharges the battery 215 so as to apply the power of the battery 215 to the display panel 221. Here, the predetermined reference value $V_d$, which is a sensing voltage for discharging the battery 215, may be determined at a value of 70 to 90% of a normal output voltage value, which may be determined as an appropriate value in consideration of the stable operation of the display panel 221. Meanwhile, when the PWM duty ratio of the inverter 130 is increased under the control of the controller 217, the power supply of the wireless power transmission device 100 is increased, thereby restoring the output voltage $V_r$ of the rectifier 212. In FIG. 5, it may be seen that the output voltage of the rectifier 212 rises due to an increase in the PWM duty ratio of the inverter. Accordingly, the power supplied to the display panel 221 is stabilized.

When the power of the display panel 221 is greater than the second threshold value (e.g., 300 W), the controller 217 controls the output of the battery 215 to be input to the display panel 221, and operates in a pulse width and frequency control mode in which the PWM duty ratio of the inverter is increased and the operating frequency of the inverter is decreased in the wireless power transmission device 100 through the first communication module 216. The wireless power transmission device 100 receives the control signal of the controller 217 through the second communication module 150, so as to increase the PWM duty ratio of the inverter 130 and reduce the operating frequency of the inverter 130, thereby increasing the power supply. In this case, the inverter 130 operates in the resonance method and decreases the frequency to increase the gain of the inverter 130.

Referring to FIG. 5, when the power of the display panel 221 rises to 500 W, a voltage drop occurs in the sensing resistor connected to the input side of the display panel 221 to a predetermined value $V_3$, and the input voltage of the converter 213, that is, the output voltage of the rectifier 212 is also dropped. When the voltage drop of the predetermined value $V_3$ occurs in the sensing resistor and the output voltage of the rectifier 212 drops, the controller 217 controls the switching unit 218 to connect the output of the battery 215 to the input of the display panel 221, and when the input voltage $V_r$ of the converter 213 drops to a value less than or equal to the predetermined reference value $V_d$, the controller 217 discharges the battery 215 so as to apply the power of the battery 215 to the display panel 221. Meanwhile, when the PWM duty ratio of the inverter 130 is increased and the operating frequency of the inverter 130 is decreased under the control of the controller 217, the power supply of the wireless power transmission device 100 is increased, thereby restoring the output voltage $V_r$ of the rectifier 212. In FIG. 5, it may be seen that the output voltage of the rectifier 212 rises due to the increase in the PWM duty ratio and decrease in the operating frequency of the inverter. Accordingly, the power supplied to the display panel 221 is stabilized.

as described above, in response to the power change of the display panel 221, the display device 201 according to the present disclosure operates as the output of the converter 213 when the power is less than or equal to a predetermined value, controls the switching to operate with the power of the battery 215 whenever the power of the display panel 221 increases to a value greater than or equal to the predetermined value, and outputs control signals of the PWM duty ratio or operating frequency to the wireless power transmission device 100 when the power of the display panel 221 is increased, thereby controlling the power to be stably supplied.

Figure 6:
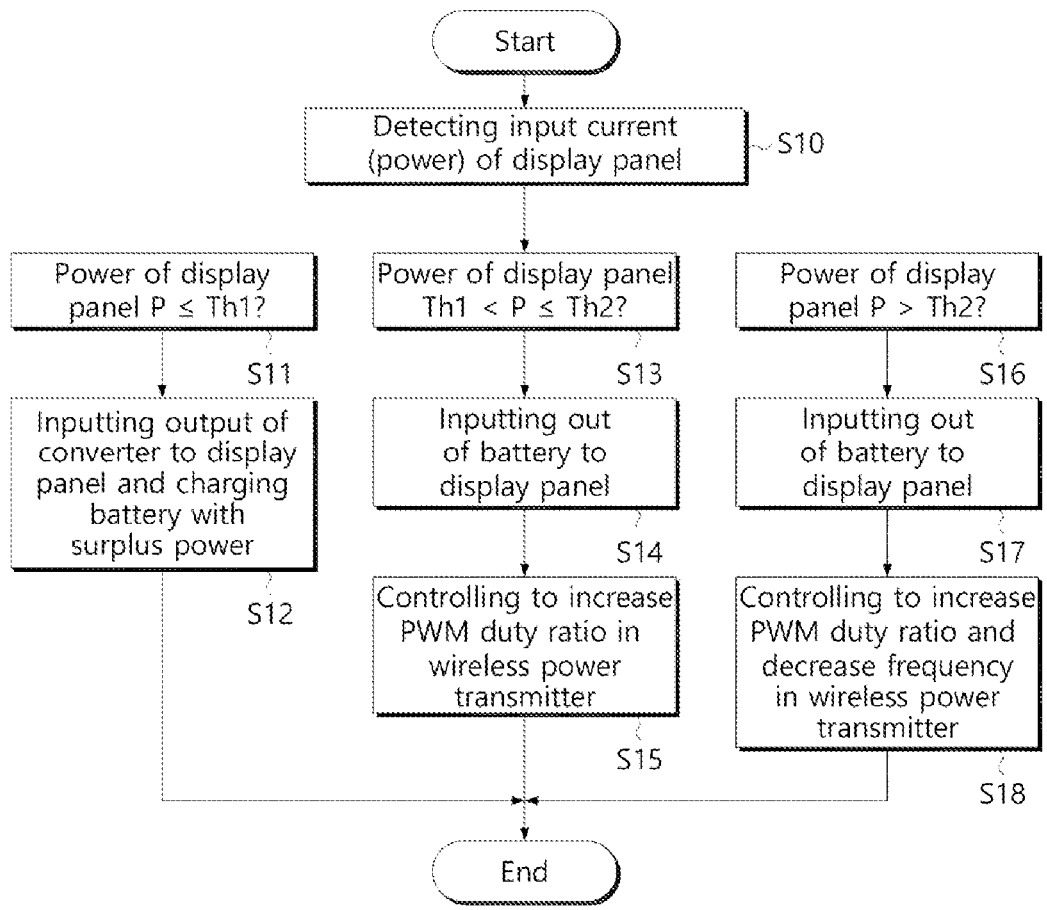
FIG. 6 is a control flowchart of a display device according to the exemplary embodiment of the present disclosure.

FIG. 6 is a control flowchart of the display device 201 according to the exemplary embodiment of the present disclosure. Referring to FIG. 6, in step S10, the controller 217 detects a voltage drop occurring in a sensing resistor on an input side of the display panel 221 and indirectly detects an input current (power) of the display panel 221. The controller 217 determines a control value on the basis of a look-up table, stored in advance, for the current (voltage) according to a voltage drop value of the sensing resistor. In addition, the controller 217 monitors whether power is stably input from the wireless power transmission device 100 by sensing an output voltage of the rectifier 212. When the power of the display panel 221 rises, the output voltage of the rectifier 212 drops and the current of the input side of the display panel 221 increases. The controller 217 detects the input current of the display panel 221 and an output voltage of the rectifier 212 so as to control the power supply of the display device 201.

In step S11, when the power of the display panel 221 is less than or equal to a first threshold value (e.g., 150 W), the controller 217 controls the output of the converter 213 to be input to the display panel 221 in step S12, and in step S12, the controller 217 controls the charger 214 to charge the battery 215 with surplus power.

In step S13, when the power of the display panel 221 is greater than the first threshold value (e.g., 150 W) and is less than or equal to the second threshold value (e.g., 300 W), the controller 217 controls the output of the battery 215 to be input to the display panel 221 in step S14, and in step S15, the controller 217 outputs a control signal for increasing a PWM duty ratio of the inverter to the wireless power transmission device 100. When power is insufficient due to an increase in the power of the display panel 221, the output voltage of the rectifier 212 drops. Accordingly, the controller 217 increases the PWM duty ratio of the inverter in the wireless power transmission device 100, thereby stabilizing the output voltage of the rectifier 212.

In step S16, when the power of the display panel is greater than the second threshold (e.g., 300 W), the controller 217 controls the output of the battery 215 to be input to the display panel 221 in step S17, and in step S18, the controller 217 outputs a control signal for increasing the PWM duty ratio and decreasing the operating frequency to the wireless power transmission device 100. In this way, the output voltage of the rectifier 212 is quickly stabilized.

As described above, the display device 201 according to the exemplary embodiment of the present disclosure connects the output of any one of the converter 213 and the battery 215 to the display panel 221 in response to a power change of a load, and controls the PWM duty ratio and operating frequency of the wireless power transmission device 100, so as to stably supply the power to the display panel 221.

Figure 7:
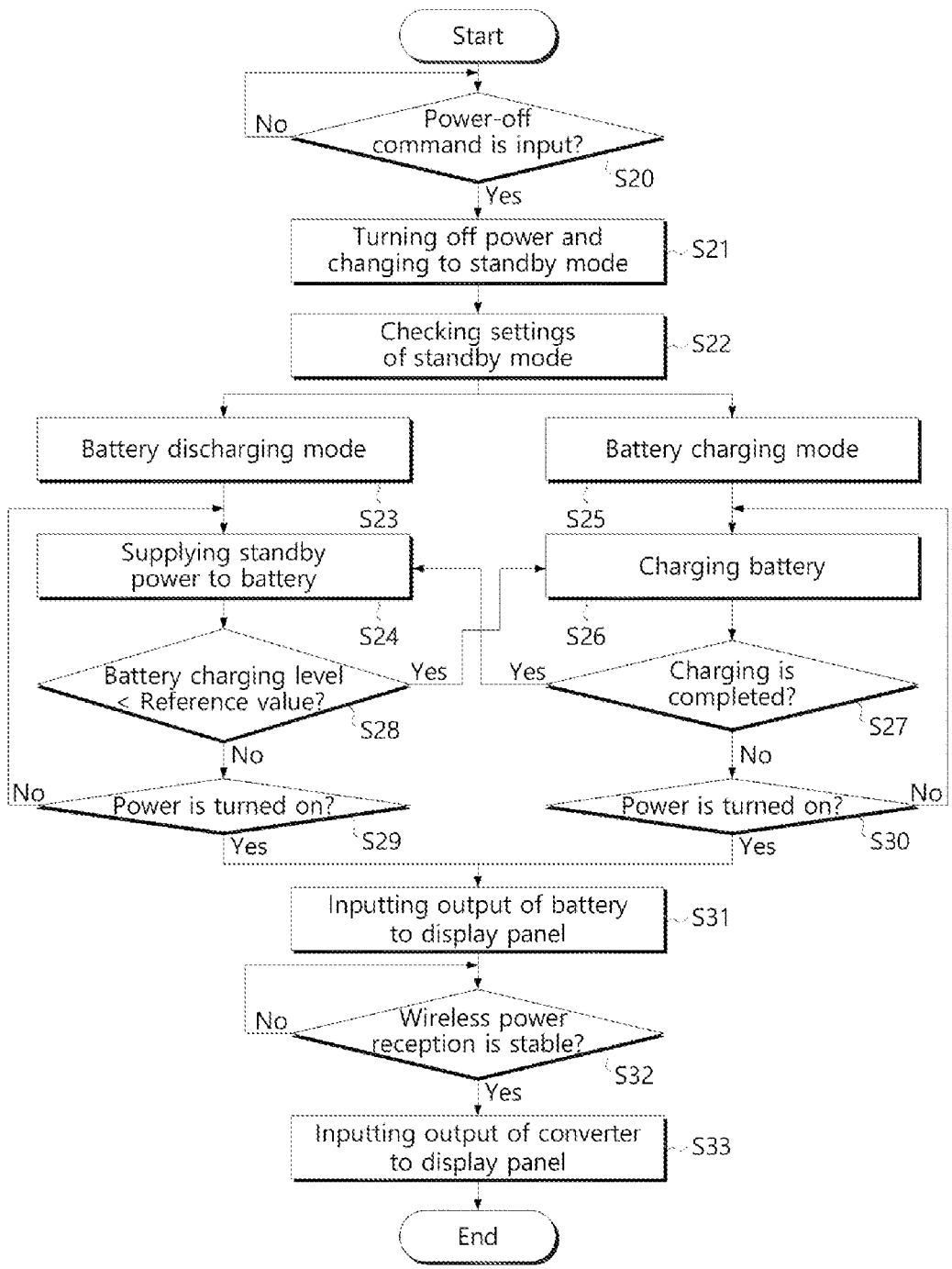
FIG. 7 is a control flowchart for describing an operation of the display device in a standby mode according to the exemplary embodiment of the present disclosure.

FIG. 7 is a control flowchart for describing the operation of the display device 201 in the standby mode according to the exemplary embodiment of the present disclosure. In step S20, when it is determined that a power-off command is applied from the remote control device 300, the power-off command is provided to the controller 217 through the first communication module 216. In step S21, the controller 217 turns off the power of the display device 201 and switches to the standby mode. The display device 201 according to the present exemplary embodiment has a UI menu to select charging and discharging of the battery 215 in the standby mode. The controller 217 generates a UI menu capable of selecting a battery 215 discharging mode operated by the battery 215 in the standby mode and a battery 215 charging mode capable of charging the battery 215 in the standby mode, and sets the mode to a corresponding mode selected by a user.

In step S22, when switched to the standby mode, the controller 217 checks the setting of the standby mode, and in step S23 when the battery 215 is set to the discharging mode, the standby power is received from the battery 215 and the wireless power transmission device 100 is turned off in step S24. In step S28, when it is determined that a charging level of the battery 215 falls to a level less than or equal to a predetermined reference value, the controller 217 controls the wireless power transmission device 100 to wake up to charge the battery 215 with low power in step S26. In step S27, when it is determined that the charging of the battery 215 is completed, the controller controls to turn off the wireless power transmission device 100 and supply the standby power to the battery 215 in step S24.

In step S25, when the standby mode is set to the battery 215 charging mode, the controller 217 controls the wireless power transmission device 100 to wake up to charge the battery 215 with the low power in step S26. In step S27, when it is determined that the charging of the battery 215 is completed, the controller controls to turn off the wireless power transmission device 100 and supply the standby power to the battery 215 in step S24.

In steps S29 and S30, in a case where the battery 215 operates in any one of the charging mode and the discharging mode, when it is determined that a power-on signal is input from the remote control device 300, the controller 217 inputs the output of the battery 215 to the display panel 221 to turn on the display panel 221 in step S31. In addition, in step S32, when it is determined that the power is stably received from the wireless power transmission device 100 by sensing the output voltage of the rectifier 212, the controller controls the switching so that the output of the converter 213 is input to the display panel 221 in step S33.

Figure 8:
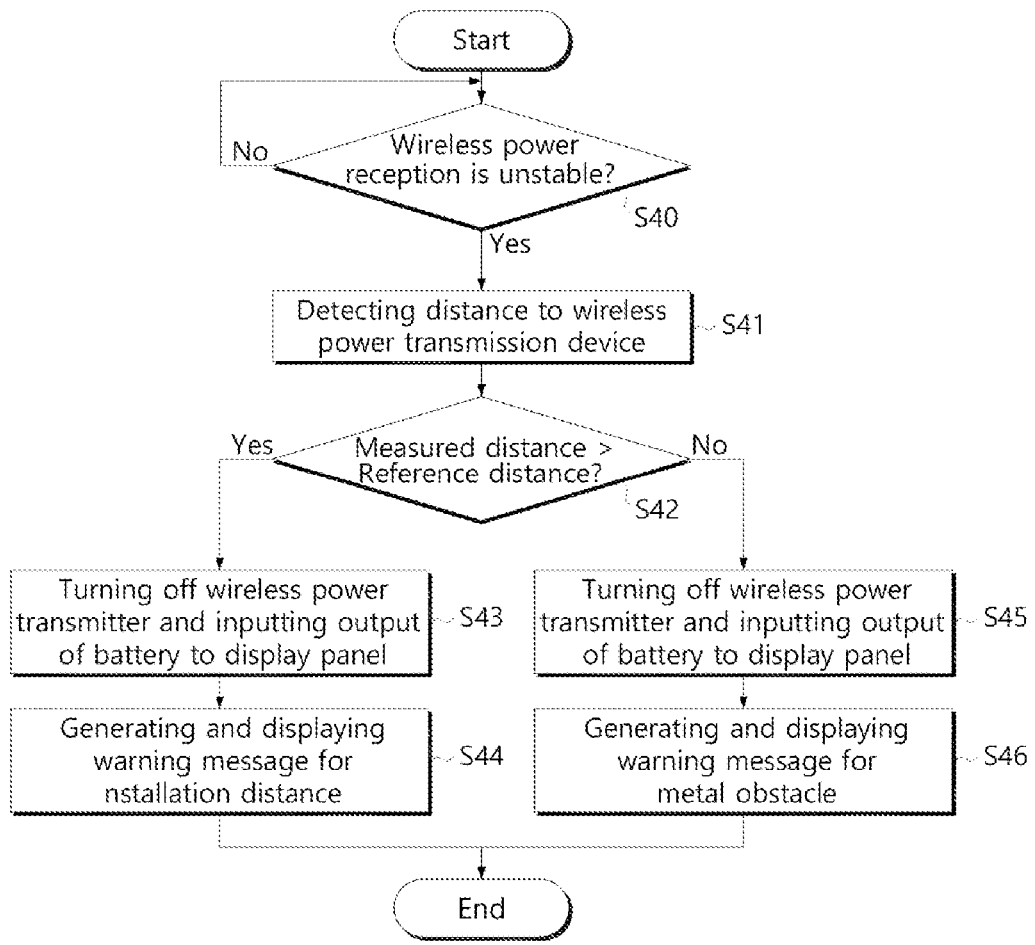
FIG. 8 is a control flowchart for describing an operation when wireless power reception of the display device is abnormal according to the exemplary embodiment of the present disclosure.

FIG. 8 is a control flowchart for describing an operation when wireless power reception of the display device 201 is abnormal according to the exemplary embodiment of the present disclosure. As described above, the controller 217 may detect the output voltage of the rectifier 212 and the input current of the display panel 221, and monitor and control the wireless power transmission through the communication with the wireless power transmission device 100. When a distance from the reception coil 211 increases due to movement of the wireless power transmitting device 100 or a metallic foreign material exists between the wireless power transmitting device 100 and the reception coil 211, the wireless power reception may become unstable.

Figure 9:
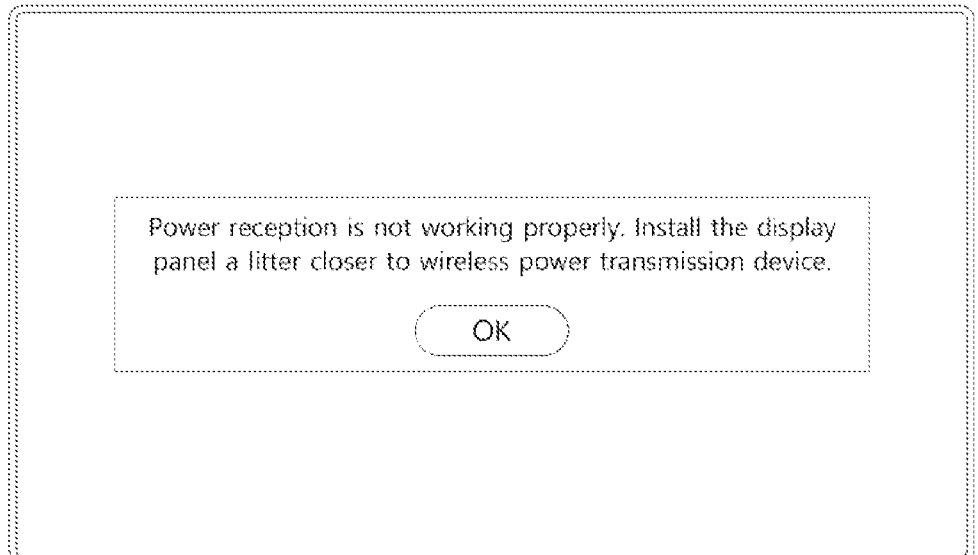
FIGS. 9(*a*) and 9(*b*) are views illustrating an example of a warning message according to the exemplary embodiment of the present disclosure.
Figure 9:
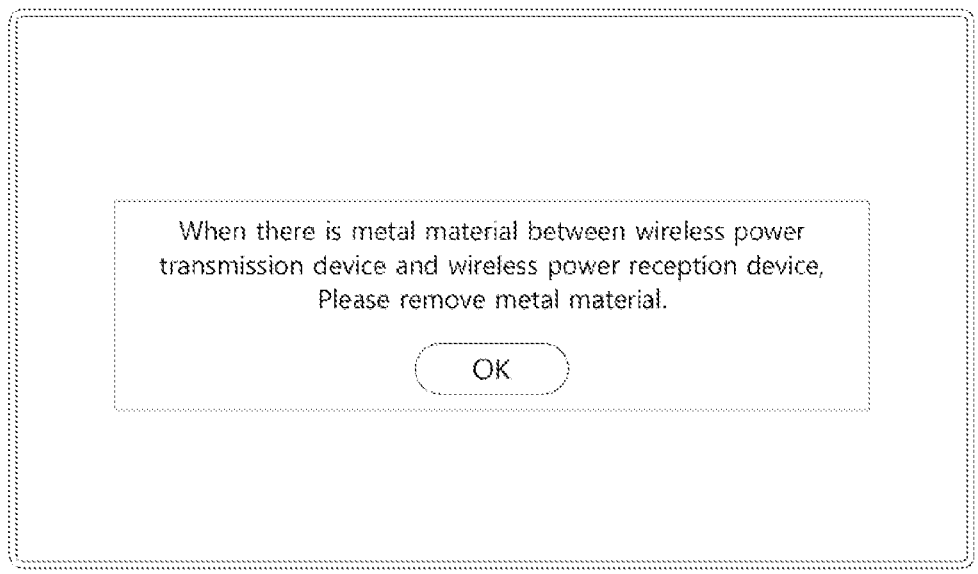

In step S40, when it is determined that the wireless power reception is unstable in a situation where the input current (power) of the display panel 221 is not increasing, the controller 217 detects a distance to the wireless power transmission device 100 in step S41. The distance to the wireless power transmission device 100 may be indirectly estimated in consideration of the relationship between the voltage of the inverter 130, the frequency/duty ratio, and the output voltage of the rectifier 212, or may be indirectly detected by using the communication strength between the communication modules. In step S42, when it is determined that the detected distance is greater than a recommended installation distance, the power of the wireless power transmission device 100 is turned off, and the output of the battery 215 is input to the display panel 221 in step S43. In addition, in step S44, the controller 217 generates a warning message for the installation distance with the wireless power transmission device 100 and displays the warning message on a screen. FIG. 9(a) is a view illustrating an example of the warning message for the installation distance. The functions of the distance measurement and warning message guidance may be usefully used when the display device 201 is initially installed or re-installed due to movement of the location thereof.

In step S45, when the detected distance is within the recommended installation distance, the power of the wireless power transmission device 100 is turned off, and the output of the battery 215 is input to the display panel 221. In addition, in step S46, the controller 217 generates a warning message for a metal obstacle and displays the warning message on the screen. FIG. 9(a) is a view illustrating an example of the warning message for the metal obstacle. The user may check whether there is the obstacle between the wireless power transmission device 100 and the reception coil 211 through this message guidance, so as to remove the obstacle.

Figure 10:
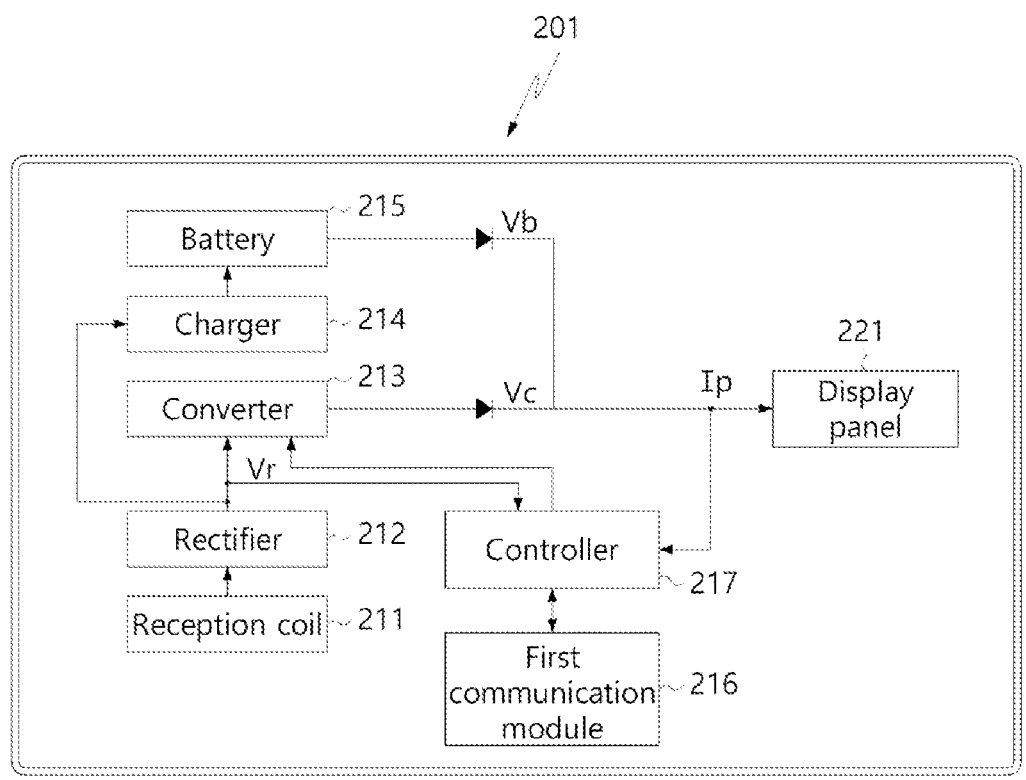
FIG. 10 is a control block diagram of the display device according to the exemplary embodiment of the present disclosure.

Hereinafter, the display device 201 according to another exemplary embodiment of the present disclosure will be described. FIG. 10 is a control block diagram of the display device 201 according to the exemplary embodiment of the present disclosure. A description overlapping with the above-described exemplary embodiment will be omitted when necessary.

The configuration of the display device 201 of FIG. 10 is substantially similar to that of the display device 201 of FIG. 2 described above. However, instead of including the switching unit 218, the output voltages of the battery 215 and the converter 213 are set differently, and the operation of the converter 213 is controlled, so as to respond to the power change of the display panel 221, whereby either one of outputs is controlled to be input to the display panel 221.

For example, by setting an output voltage $V_b$ of the battery 215 to be lower than an output voltage $V_c$ of the converter 213, the output of the converter 213 is allowed to be input to the display panel 221 when in a normal mode, that is, in the mode where the power of the display panel 221 is less than or equal to the first threshold value 150 W. In this case, diodes are respectively connected to the outputs of the battery 215 and the converter 213, so that a current flows in only one direction toward the display panel 221, thereby stabilizing the current.

When the power of the display panel 221 is greater than the first threshold value (e.g., 150 W) and is less than or equal to the second threshold value (e.g., 300 W), the controller 217 turns off the power of the converter 213, so as to control the output of the battery 215 to be input to the display panel 221. In addition, the controller 217 outputs a control signal for increasing a PWM duty ratio of the inverter to the wireless power transmission device 100, so as to stabilize the output voltage of the rectifier 212.

When the power of the display panel is greater than the second threshold value (e.g., 300 W), the controller 217 controls the output of the battery 215 to be input to the display panel 221 by turning off the output of the converter 213, and outputs a control signal for increasing the PWM duty ratio and decreasing an operating frequency to the wireless power transmission device 100, thereby stabilizing the output voltage of the inverter quickly.

Figure 11:
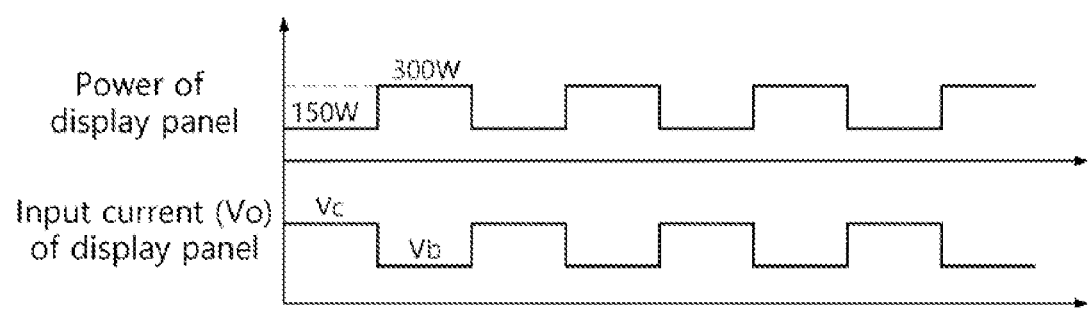
FIG. 11 is a view illustrating power of the display panel and an input voltage of the display panel according to the display device of FIG. 10.

FIG. 11 is a view illustrating the power of the display panel 221 and the input voltage of the display panel according to the display device 201 of FIG. 10. It may be seen that the voltage $V_c$ output from the converter 213 is supplied to the display panel 221 when the power is less than or equal to 150 W, and the voltage $V_b$ output from the battery 215 is supplied to the display panel 221 when the power is greater than or equal to 150 W.

As described above, the display device 201 according to the exemplary embodiment of the present disclosure connects the output of any one of the converter 213 and the battery 215 to the display panel 221 in response to the power change in the load, and controls the PWM duty ratio and operating frequency of the wireless power transmission device 100, so as to stably supply power to the display panel 221.

Meanwhile, an operating method of the electronic device 200 of the present disclosure may be implemented as a processor-readable code on a processor-readable recording medium provided in the electronic device 200. The processor-readable recording medium includes all types of recording devices in which data readable by the processor is stored. Examples of the processor-readable recording medium include ROM, RAM, CD-ROM, magnetic tape, floppy disk, optical data storage device, and the like, and also includes those implemented in the form of carrier waves such as transmission over the Internet. In addition, the processor-readable recording medium is distributed in a computer system connected to a network, so that the processor-readable code may be stored and executed in a distributed method.

In addition, in the above, the preferred exemplary embodiments of the present disclosure have been illustrated and described, but the present disclosure is not limited to the specific exemplary embodiments described above. In the present disclosure, various modifications may be possible by those skilled in the art to which the present disclosure belongs without departing from the spirit of the present disclosure claimed in the claims, and these modifications should not be understood individually from the technical ideas or prospect of the present disclosure.

The invention claimed is:

1. An electronic device comprising:
   a load;
   a sensing resistor connected to an input side of the load;
   a reception coil configured to generate an induced electromotive force by magnetic inductive coupling with a wireless power transmission device;
   a rectifier configured to rectify a voltage generated by the reception coil;
   a converter configured to convert the rectified voltage of the rectifier into a target voltage of the load;
   a battery configured to supply power to the load;
   a charger configured to charge the battery by using the rectified voltage of the rectifier;
   a switching unit configured to perform switching so that one of an output of the converter or an output of the battery is selectively connected to an input of the load;
   a memory configured to store table information comprising predefined associations of control commands for controlling the switching unit based on corresponding voltage drop values detected at the sensing resistor; and
   a controller configured to:
   detect a voltage drop at the sensing resistor; and
   generate a control command based on the stored table information using the detected voltage drop, wherein the control command controls the switching unit to operate such that the output of the battery is input to the load when a power of the load corresponding to the detected voltage drop is greater than a first threshold value, and such that an output of the converter is input to the load when the power of the load corresponding to the detected voltage drop is less than or equal to the first threshold value.

2. The electronic device of claim 1, wherein an output voltage of the converter is set greater than an output voltage of the battery.

3. The electronic device of claim 1, wherein the controller is further configured to control the output of the battery to be applied to the load when the output voltage of the rectifier falls to a value less than or equal to a predetermined set value.

4. The electronic device of claim 1, wherein the controller controls the charger to charge the battery with surplus power when the power of the load is less than or equal to the first threshold value.

5. The electronic device of claim 1, further comprising:
   a communication module configured to communicate with the wireless power transmission device,
   wherein the controller outputs a control signal to increase a pulse width modulation duty ratio to the wireless power transmission device through the communication module when the power of the load is greater than the first threshold value and is less than or equal to a second threshold value.

6. The electronic device of claim 5, wherein the controller outputs the control signal to increase the pulse width modulation duty ratio and decrease an operating frequency to the wireless power transmission system through the communication module when the power of the load is greater than the second threshold value.

7. The electronic device of claim 1, wherein the controller is further configured to control the switch such that the output of the battery is input to the load when a power-on command is input, and control the switch such that the output of the converter is input to the load when the power is stably received at a level greater than or equal to a predetermined level from the wireless power transmission device.

8. The electronic device of claim 1, wherein the controller controls to operate the wireless power transmission device and the charger in a standby mode so as to charge the battery, and operates the standby mode on the power of the battery when the battery is fully charged.

9. The electronic device of claim 8, further comprising:
   a UI menu configured to select charging and discharging of the battery in the standby mode,
   wherein the controller controls to operate the wireless power transmission device and the charger so as to charge the battery when a charging mode is selected in the UI menu, operates the standby mode on the power of the battery when the battery is fully charged, operates on the power of the battery when a discharging mode is selected from the UI menu, and controls to operate the wireless power transmission device and the charger so as to charge the battery when the charging level of the battery is less than or equal to the predetermined reference value.

10. The electronic device of claim 1, wherein the controller operates on the power of the battery in the standby mode, and controls to operate the wireless power transmission device and the charger so as to charge the battery when a charging level of the battery is less than or equal to a predetermined reference value.

11. The electronic device of claim 1, wherein when a distance between the reception coil and the wireless power transmission device is detected and the distance is greater than or equal to a predetermined value or the power is not normally input from the wireless power transmission device, the controller outputs a control signal to stop an operation of the wireless power transmission device, controls to allow the output of the battery to be input to the load, and controls to generate a warning message so as to output the warning message.

12. The electronic device of claim 11, wherein the load comprises a display panel, and the controller reduces luminance of the display panel when the output of the battery is input to the display panel.

13. The electronic device of claim 1, wherein the load comprises a display panel, and is provided with a battery seating module configured to allow the battery to be detachable therefrom on a rear surface of the display panel.

14. The electronic device of claim 1, wherein the load comprises at least one of a display panel, a motor, and an audio module, which have a dynamic load characteristic.

15. A method for controlling an electronic device comprising a reception coil, a memory, a load, a battery, a rectifier, and a converter for receiving and converting wireless power, the method comprising:
   generating, via the reception coil, an induced electromotive force by magnetic inductive coupling with a wireless power transmission device;
   rectifying, via the rectifier, a voltage generated by the reception coil;
   converting, via the converter, the rectified voltage of the rectifier into a target voltage of the load;
   detecting a voltage drop at a sensing resistor connected to an input side of the load; and
   generating a control command based on table information stored in the memory using the detected voltage drop, wherein the control command controls a switching unit to operate such that an output of the battery is input to the load when a power of the load corresponding to the detected voltage drop is greater than a first threshold value, and such that an output of the converter is input to the load when the power of the load corresponding to the detected voltage drop is less than or equal to the first threshold value, wherein the stored table information comprises predefined associations of control commands for controlling the switching unit based on corresponding voltage drop values detected at the sensing resistor.

16. The method of claim 15, further comprising:
outputting a control signal to increase a pulse width modulation duty ratio to a wireless power transmission device when the power of the load is greater than the first threshold value and is less than or equal to a second threshold value, and outputting the control signal to increase the pulse width modulation duty ratio and decrease an operating frequency to the wireless power transmission device when the power of the load is greater than the second threshold value.

17. A wireless power transceiving system comprising:
a wireless power transmission device comprising a filter/power factor correction configured to receive power input from outside to remove noise and improve a power factor of the power, an inverter connected to the filter/power factor correction to convert an input DC voltage into an AC voltage, a transmission coil configured to generate a magnetic field by the AC voltage, and a transmission controller configured to control an operation of the inverter; and
a wireless power reception device comprising:
a load,
a sensing resistor connected to an input side of the load,
a reception coil configured to generate an induced electromotive force by magnetic inductive coupling with the transmission coil,
a rectifier configured to rectify a voltage generated by the reception coil,
a converter configured to convert the rectified voltage of the rectifier into a target voltage of the load,
a battery configured to supply the power to the load,
a charger configured to charge the battery by using the rectified voltage of the rectifier
a switching unit configured to perform switching so that one of an output of the converter or an output of the battery is selectively connected to an input of the load,
a memory configured to store table information comprising predefined associations of control commands for controlling the switching unit based on corresponding voltage drop values detected at the sensing resistor, and
a controller configured to:
detect a voltage drop at the sensing resistor, and
generate a control command based on the stored table information using the detected voltage drop, wherein the control command controls the switching unit to operate such that the output of the battery is input to the load when a power of the load corresponding to the detected voltage drop is greater than a first threshold value, and such that an output of the converter is input to the load when the power of the load corresponding to the detected voltage drop is less than or equal to the first threshold value.

18. The wireless power transceiving system of claim 17, wherein the controller provided in the wireless power reception device is configured to output any one of a PWM control signal and operating frequency control signal of the inverter to the wireless power transmission device in response to the power change of the load.

* * * * *